(12) United States Patent
Lindell

(10) Patent No.: US 12,545,197 B2
(45) Date of Patent: Feb. 10, 2026

(54) RETAINING SYSTEM FOR ELECTRICAL CABLES OF AN INDUSTRIAL VEHICLE

(71) Applicant: VOLVO TRUCK CORPORATION, Gothenburg (SE)

(72) Inventor: Kenneth Lindell, Trollhättan (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 313 days.

(21) Appl. No.: 18/315,776

(22) Filed: May 11, 2023

(65) Prior Publication Data

US 2023/0406237 A1  Dec. 21, 2023

(30) Foreign Application Priority Data

Jun. 17, 2022 (EP) .................................... 22179566

(51) Int. Cl.
- *B60R 16/02* (2006.01)
- *H02G 3/30* (2006.01)
- *H02G 3/32* (2006.01)

(52) U.S. Cl.
CPC ........... *B60R 16/0215* (2013.01); *H02G 3/30* (2013.01); *H02G 3/32* (2013.01)

(58) Field of Classification Search
CPC .... B60R 16/0215; H01B 7/0045; H02G 3/30; H02G 3/32
See application file for complete search history.

(56) References Cited

U.S. PATENT DOCUMENTS

| | | | |
|---|---|---|---|
| 7,854,413 B2 * | 12/2010 | Yamamoto | F16L 3/015 296/146.7 |
| 8,153,897 B2 | 4/2012 | Yamamoto | |
| 9,725,053 B2 | 8/2017 | Terada et al. | |
| 10,202,087 B2 | 2/2019 | Tomosada et al. | |
| 2006/0021782 A1 | 2/2006 | Tsubaki | |
| 2007/0267211 A1 * | 11/2007 | Yamamoto | B60R 16/0207 174/68.1 |
| 2008/0035799 A1 | 2/2008 | Yamamoto et al. | |

(Continued)

FOREIGN PATENT DOCUMENTS

| | | |
|---|---|---|
| WO | 2009041862 A1 | 4/2009 |
| WO | 2022108447 A1 | 5/2022 |

OTHER PUBLICATIONS

European Search Report dated Dec. 16, 2022 in corresponding European Patent Application No. 22179566.9, 5 pages.

*Primary Examiner* — Paresh Paghadal
(74) *Attorney, Agent, or Firm* — Jeffri A. Kaminski; Venable LLP

(57) ABSTRACT

A retaining system for holding and routing electrical cables of an industrial vehicle, the electrical cables being configured to electrically supply an electrical equipment. The retaining system includes a C-shaped flexible retaining member, configured to receive the electric cables, the retaining member comprising: a first fixing bracket configured to be fixed to the electrical equipment, a second fixing bracket configured to be fixed to a frame of the industrial vehicle, a first linking rod, a second linking rod, wherein the first linking rod is pivotally mounted relatively to the first fixing bracket, and wherein the second linking rod is pivotally mounted relatively to the second fixing bracket so as to guide the retaining member when the electrical equipment moves relatively to the frame.

15 Claims, 6 Drawing Sheets

(56) References Cited

U.S. PATENT DOCUMENTS

| | | | |
|---|---|---|---|
| 2008/0035800 A1* | 2/2008 | Yamamoto | F16L 3/015 |
| | | | 248/70 |
| 2009/0095858 A1* | 4/2009 | Katou | B60R 16/0215 |
| | | | 248/205.1 |
| 2009/0101407 A1* | 4/2009 | Yamamoto | B60R 16/0215 |
| | | | 174/72 A |
| 2024/0359643 A1* | 10/2024 | Kimura | H02G 3/0475 |

* cited by examiner

RETAINING SYSTEM FOR ELECTRICAL CABLES OF AN INDUSTRIAL VEHICLE

TECHNICAL FIELD

This disclosure relates to a retaining system for holding and routing electrical cables in an industrial vehicle such as a truck.

BACKGROUND ART

It is common to equip industrial vehicles with high-power electrical systems, for example several tens of kilowatts. Such electrical systems can for example comprise an electric motor contributing to the propulsion of the vehicle or ensuring this propulsion. Power cables thus connect a mechanical system generating vibrations, such as a rotating machine, to an electronic control unit. The electric machine can for example be fixed to an axle of the vehicle, therefore subjected to suspension travel. The electronic control unit is usually fixed to the chassis, or frame, of the vehicle, and is therefore less exposed to vibrations. Power supply cables having a large section and a significant weight, the vibrations and movements transmitted to one end of the cables propagate all along the cables and can affect the components connected by these cables. These repeated vibrations and relative displacements can in the long-term damage the electrical connectors connected to the electrical machine, or those linked to the cables, or those linked to the control unit. The electronic components of the control unit itself can also be damaged by the vibrations and movements transmitted along the electrical cables.

There is therefore a need to propose a solution limiting the effect of the vibrations that may be transmitted along the electric cables.

SUMMARY

To the end, it is proposed a retaining system for holding and routing electrical cables of an industrial vehicle, the electrical cables being configured to electrically supply an electrical equipment, the retaining system comprising:
 a C-shaped flexible retaining member, configured for receiving the electric cables, the retaining member comprising:
  a first fixing bracket configured to be fixed to the electrical equipment,
  a second fixing bracket configured to be fixed to a frame of the industrial vehicle,
the retaining system further comprising:
 a first linking rod,
 a second linking rod,
wherein the first linking rod is pivotally mounted relatively to the first fixing bracket, and wherein the second linking rod is pivotally mounted relatively to the second fixing bracket, so as to guide the retaining member when the electrical equipment moves relatively to the frame.

The flexibility of the retaining member, associated with the guiding provided by the two linking rods provide a compliance to the electric cables while guiding their movements. The energy of the vibrations is damped into the retaining system, thus reducing the negative effect of the vibrations. This flexible system distributes the relative movement along the complete C-shaped retaining member. A bending of the cables in a specific point is avoided. This provides a longer lifetime for the cables. The reliability of the electrical cables and of their connectors is improved.

The following features can optionally be implemented, separately or in combination one with the others:

In an embodiment of the retaining system, the C-shaped retaining member comprises a third fixing bracket,
 the first linking rod is pivotally mounted relatively to the first fixing bracket and relatively to the third fixing bracket,
 and the second linking rod is pivotally mounted relatively to the second fixing bracket and relatively to the third fixing bracket.

The C-shaped retaining member is further guided by the mechanical link between the third fixing bracket and both linking rods. The constraints generated by the relative movements between the electrical equipment and the frame of the vehicle are more homogeneously distributed across the cables length, which improves the protection offered by the C-shaped guide. Both linking rods together with the third fixing bracket also work as a stabilizer in the longitudinal direction of the C-shaped retaining member.

According to an aspect of the retaining system, the electrical cables are configured to connect the electrical equipment and an electronic control module configured for driving the electrical equipment.

The first linking rod is rigid.

The second linking rod is rigid.

The electrical equipment can be a rotating electrical machine.

For example, the electrical equipment can be an electric motor.

In an embodiment of the retaining system, the electrical equipment is flexibly mounted relatively to the frame of the industrial vehicle.

In an example of implementation, silent blocks can be interposed between the electrical equipment and the frame of the vehicle.

In another example of implementation, the electrical equipment is fixed to an unsprung mass of the industrial vehicle and the electronic control module controlling the electrical equipment is fixed to a sprung mass, like the frame of the industrial vehicle. The suspension travel causes relative displacement between the electrical equipment and the frame of the vehicle. Therefore, there's also relative displacement between both ends of the cables.

The first fixing bracket can be arranged at a first end of the retaining member.

The second fixing bracket can be arranged at a second end of the retaining member.

This arrangement helps keeping the retaining system compact.

Preferably, the third fixing bracket is arranged at an intermediate position between the first end of the retaining member and the second end of the retaining member.

For example, the third fixing bracket is arranged at an equal distance from the first fixing bracket and from the second fixing bracket.

In an embodiment, the first fixing bracket can be integral with the C-shaped retaining member.

Similarly, the second fixing bracket and the third fixing bracket can be integral with the C-shaped retaining member.

The C-shaped retaining member may be in plastic. The C-shaped retaining member
 may be in aluminium.

In an embodiment of the retaining system, a cross section of the electrical cables is larger than 20 mm$^2$.

According to an embodiment of the retaining system, the first linking rod and the second linking rod are pivotally mounted on a same pivot of the third fixing bracket.

In an alternative embodiment, the third fixing bracket may comprise a first pivot receiving an end of the first linking rod and a second pivot receiving an end of the second linking rod, the two pivots being parallel to each other.

The first linking rod may be tube shaped.

The first linking rod may be flat shaped. The first linking rod may have a L-shaped cross-section.

The second linking rod may be tube shaped.

The second linking rod may be flat shaped. The second linking rod may have a L-shaped cross-section.

The first linking rod may be metallic.

The second linking rod may be metallic.

Each linking rod may comprise a bushing in which a pivot of a corresponding fixing bracket is received.

According to an embodiment, the C-shaped retaining member comprises curled edges forming an abutment member for the electrical cables.

The shape and size of the curled edges, associated with the stiffness of the cables, are sufficient to secure the electrical cables in the C-shaped retaining member.

Alternatively, or as a complement, the retaining system comprises clamps configured for securing the electrical cables to the C-shaped retaining member.

The clamps avoid the cables from slipping out of the retaining member when the bearing surface of the retaining member is flat.

The length of the first linking rod is comprised between 500 millimeters and 800 millimeters.

The length of the second linking rod is comprised between 500 millimeters and 800 millimeters.

In an embodiment, the first linking rod and the second linking rod have identical length.

A minimum curvature radius of the C-shaped retaining member is comprised between 150 millimeters and 250 millimeters.

Preferably, the first fixing bracket and the second fixing bracket are located on a same vertical axis when the retaining system is in a normal installation position in the industrial vehicle.

The pivot axis of the first linking rod relatively to the first fixing bracket is parallel to the pivot axis of the first linking rod relatively to the third fixing bracket.

The pivot axis of the second linking rod relatively to the second fixing bracket is parallel to the pivot axis of the second linking rod relatively to the third fixing bracket.

The movements of the retaining member are located in a plane. The space needed to accommodate the retaining system is limited.

In an embodiment, the distance between the pivot axis of the first linking rod relatively to the first fixing bracket and the pivot axis of the second linking rod relatively to the second fixing bracket is comprised between 200 millimeters and 300 millimeters.

According to an embodiment of the retaining system, the first linking rod and the second linking rod extend in a plane perpendicular to the pivot axis of the linking rods.

A developed length of the C-shaped retaining member is comprised between 1200 millimeters and 1800 millimeters.

In an embodiment, the retaining system comprises a housing configured for receiving the C-shaped retaining member, the first linking rod and the second linking rod.

The housing protects the retaining member and the electrical cables from impacts
caused by stones, or any object projected by the wheels of the industrial vehicle.

The housing may have a cuboid shape.

The housing may be in plastic.

The housing may be fixed to the frame of the industrial vehicle.

The present disclosure also relates to an industrial vehicle comprising:
an electrical equipment,
electrical cables configured for electrically supplying the electrical equipment,
a retaining system as described earlier,
in which the electrical cables are received in the C-shaped retaining member of the retaining system.

The industrial vehicle can be a truck, such as a long-haul truck, or an off-road truck such as a construction truck or a mining truck.

In an embodiment, the retaining system extends between two vertical planes each perpendicular to a longitudinal axis of the industrial vehicle.

BRIEF DESCRIPTION OF DRAWINGS

Other features, details and advantages will be shown in the following detailed description and on the figures, on which.

DESCRIPTION OF EMBODIMENTS

In order to make the figures easier to read, the various elements are not necessarily represented to scale. In these figures, identical elements receive the same reference number. Certain elements or parameters can be indexed, that is to say designated for example by 'first element' or second element, or first parameter and second parameter, etc. The purpose of this indexing is to differentiate elements or parameters that are similar, but not identical. This indexing does not imply a priority of one element, or one parameter over another, and their names can be interchanged. When it is mentioned that a subsystem comprises a given element, the presence of other elements in this subsystem is not excluded.

Figure 1:
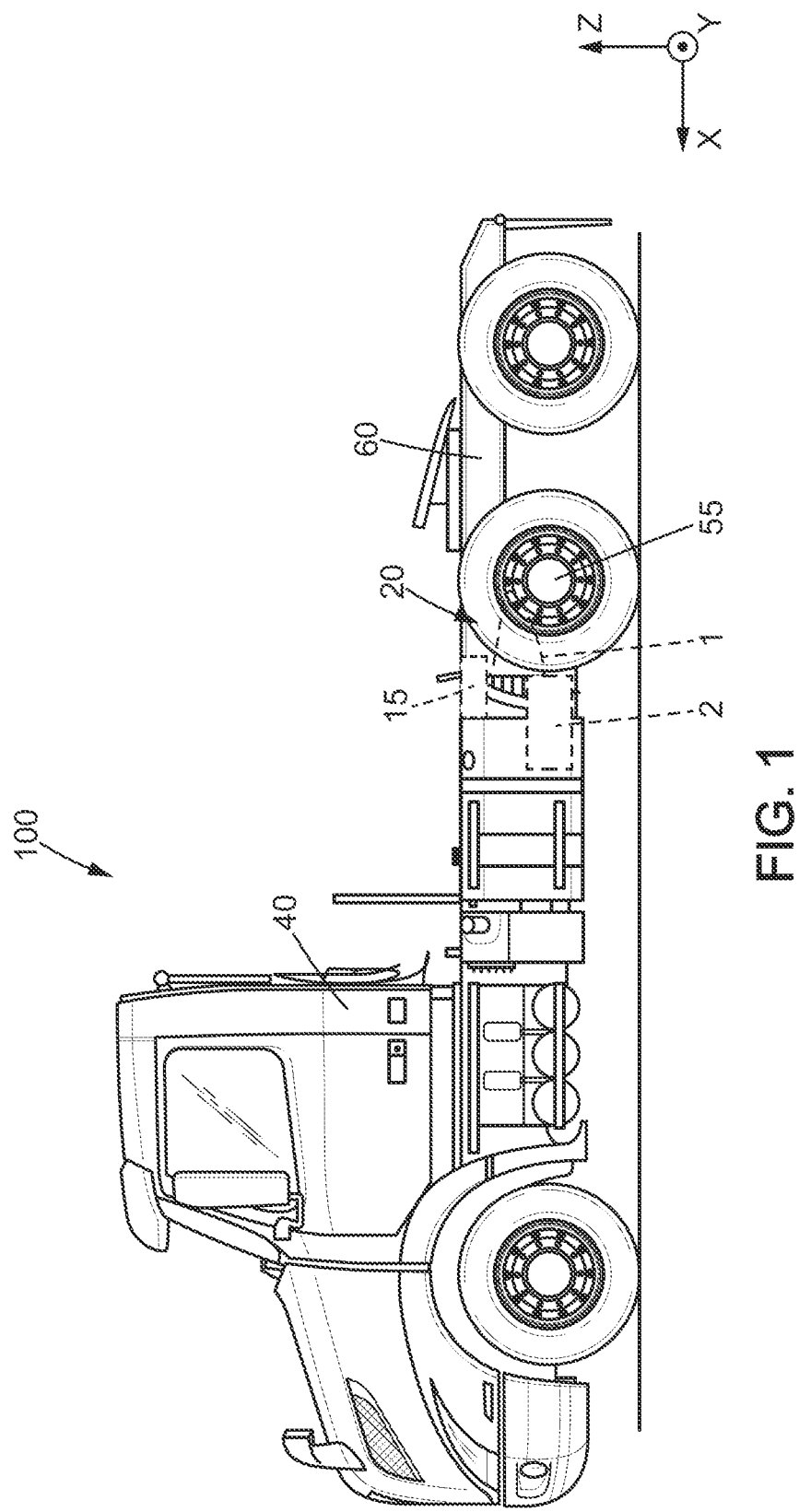
FIG. 1 is a schematic side view of an industrial vehicle with a step assembly.

FIG. 1 represents an industrial vehicle 100 such as a truck. The truck can be a long-haul truck, or an off-road truck such as a construction truck or a mining truck. The truck 100 comprises a frame 60 on which the main mechanical subassemblies are fitted, like the powertrain, cabin and axles.

The industrial vehicle 100 comprises:
an electrical equipment 2,
electrical cables 1 configured for electrically supplying the electrical equipment 2,
a retaining system 20 that will be described in detail below.

The electrical cables 1 are received in a C-shaped retaining member 3 of the retaining system 20.

The electrical equipment 2 is in this illustrated example a rotating electrical machine. For example, the electrical equipment 2 is an electric motor. The electric motor participates at least in part to the propulsion of the truck 100. An electronic control module 15 is configured for driving the electrical equipment 2 and supplying command currents. When the truck 100 is in normal use configuration, the electrical cables 1 connect the electrical equipment 2 and the electronic control module 15. For this, each of the electrical cables comprise at each end a connector 10, one connector being inserted in a complementary connector of the electrical equipment 2 and the other connector being inserted in a complementary connector of the electronic control module 15. Each connector 10 is secured to the equipment in which it is inserted, for example by embedded retention clips. The electronic control module 15 is not represented on FIGS. 2 to 4 and 7,8.

The electrical equipment 2 is flexibly mounted relatively to the frame 60 of the industrial vehicle 100. Indeed, the electric motor is fixed to a driving axle of the truck 100. The electric motor 2 is thus fixed to an unsprung mass of the industrial vehicle 100, while the electronic control module 15 controlling the electrical equipment 2 is fixed to a sprung mass, like the frame 60 of the industrial vehicle 100. The suspension travel causes relative displacement between the electrical equipment and the frame 60 of the vehicle. Therefore, there's also relative displacement between both ends of the cables.

As the electrical cables 1 have to accommodate these movements, some flexing of the cables occurs. When the electrical cables 1 are not supported, the repeated flexing will compromise the integrity of the cables and/or the connectors fitted at each end of the cables. In the long term the reliability of the electrical connection may be at risk. Therefore, some mechanical support is provided to the electrical cables 1.

In other applications, not represented here, silent blocks can be interposed between the electrical equipment 2 and the frame 60 of the vehicle 100. Although the amplitude of the relative displacement between the electrical equipment and its associated electronic control module is then largely lower than the suspension travel, providing a mechanical support to the electrical cables 1 is still beneficial for their reliability.

To the end, it is proposed a retaining system 20 for holding and routing electrical cables 1 of an industrial vehicle 100, the electrical cables 1 being configured to electrically supply an electrical equipment 2, the retaining system 20 comprising:
- a C-shaped flexible retaining member 3, configured for receiving the electric cables 1, the retaining member 3 comprising:
  - a first fixing bracket 4 configured to be fixed to the electrical equipment 2,
  - a second fixing bracket 5 configured to be fixed to a frame 60 of the industrial vehicle 100.

The retaining system 20 further comprises:
- a first linking rod 7,
- a second linking rod 8.

The first linking rod 7 is pivotally mounted relatively to the first fixing bracket 4, and the second linking rod 8 is pivotally mounted relatively to the second fixing bracket 5, so as to guide the retaining member 3 when the electrical equipment 2 moves relatively to the frame 60.

The two linking rods 7,8 and the retaining member 3 form a kinematic mechanism, since a kinematic degree of freedom is present, one linking rod being articulated relatively to the other linking rod. The flexibility of the retaining member 3, associated with the guiding provided by the two linking rods 7,8 provide a compliance to the electrical cables 1 while guiding the movements of their two ends, particularly their vertical movements. The energy of the vibrations is damped and dissipated into the retaining system 20, thus reducing the negative effect of the vibrations. The reliability of the electrical cables 1 and of their connectors 10 is improved.

The retaining member 3 has a general shape of a ribbon, that can be forced to take a curved shape similar to a C. The curvature radius is not constant over the length of the retaining member 3. The width of the retaining member 3 may be constant along its length.

In the illustrated embodiment of the retaining system 20, the C-shaped retaining member 3 comprises a third fixing bracket 6.

The first linking rod 7 is pivotally mounted relatively to the first fixing bracket 4 and relatively to the third fixing bracket 6, and the second linking rod 8 is pivotally mounted relatively to the second fixing bracket 5 and relatively to the third fixing bracket 6.

Figure 2:
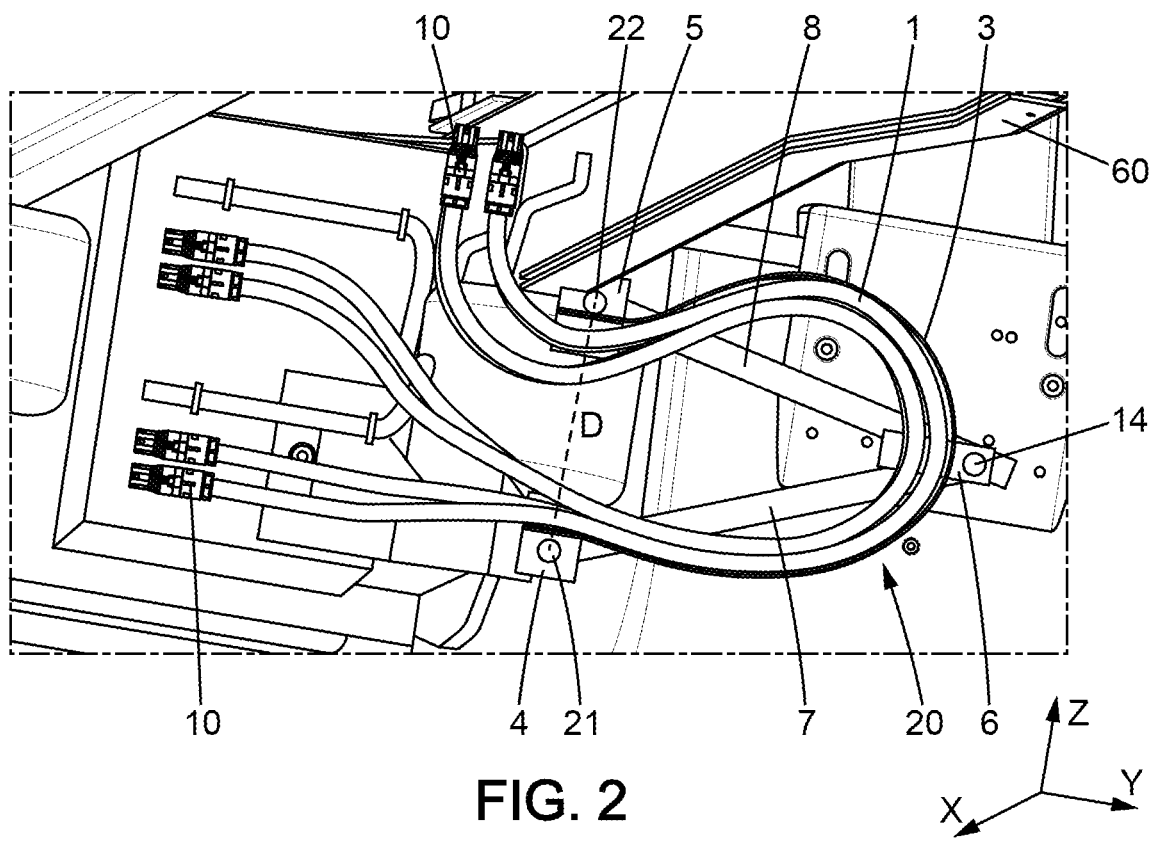
FIG. 2 is a general view of an embodiment of a retaining system according to the disclosure, integrated in an industrial vehicle.

On FIG. 2, sign 21 refers to the pivot of the first linking rod 7 relatively to the first fixing bracket 4 and sign 22 refers to the pivot of the second linking rod 8 relatively to the second fixing bracket 5. Each pivot may comprise a portion of cylindrical shaft engaged in a cylindrical housing. The portion of the shaft may be integral with the linking rod, with the cylindrical housing disposed in the fixing bracket. The portion of the shaft may be integral with the fixing bracket, with the cylindrical housing disposed in the linking rod. The shaft may also be a part separate from the linking rod and the fixing bracket. Both linking rod and fixing bracket comprise a cylindrical reception housing in which the separate shaft is fitted. For each example of implementation, an axial end-stop ensures the fixing bracket and the linking rod remain joined together.

The C-shaped retaining member 3 is further guided by the mechanical link between the third fixing bracket 6 and the two linking rods 7,8. The constraints generated by the relative movements between the electrical equipment 2 and the frame 60 of the vehicle 100 are more homogeneously distributed across the cables' length. The C-shaped retaining member 3 is guided at both its ends and at an intermediate position. Three guiding areas are provided.

Advantageously, the C-shaped guide represents another layer of protection when the cables are routed inside the C-shape. Though, the main function of the C-shape is to guide the cables so that they keep their C-form in a controlled way.

The first linking rod 7 is rigid. On the illustrated example, the first linking rod 7 is flat shaped. The first linking rod 7 may also have a L-shaped cross-section. The legs of the angle may be equal or unequal. A L-shaped cross-section provides an increased stiffness for equal mass. The first linking rod 7 may also be tube shaped.

Similarly, the second linking rod 7 is rigid. The second linking rod 8 is here flat shaped. On non-represented examples, the second linking rod 8 can be tube shaped. The second linking rod 8 can also have a L-shaped cross-section.

The first linking rod 7 if for example metallic. In the same way, the second linking rod 8 may be metallic.

Each linking rod 7, 8 may comprise a bushing in which a pivot of a corresponding fixing bracket 4, 5, 6 is received. The bushing ensures low friction and low mechanical play ensuring an accurate guiding of the retaining member 3 by the linking rods 7,8. The bushings are not visible on the different figures.

The first fixing bracket 4 is arranged at a first end 11 of the retaining member 3. The second fixing bracket 5 is arranged at a second end 12 of the retaining member 3. This arrangement helps keeping the retaining system 20 compact.

The third fixing bracket 6 is arranged at an intermediate position 13 between the first end 11 of the retaining member 3 and the second end 12 of the retaining member 3.

Figure 4:
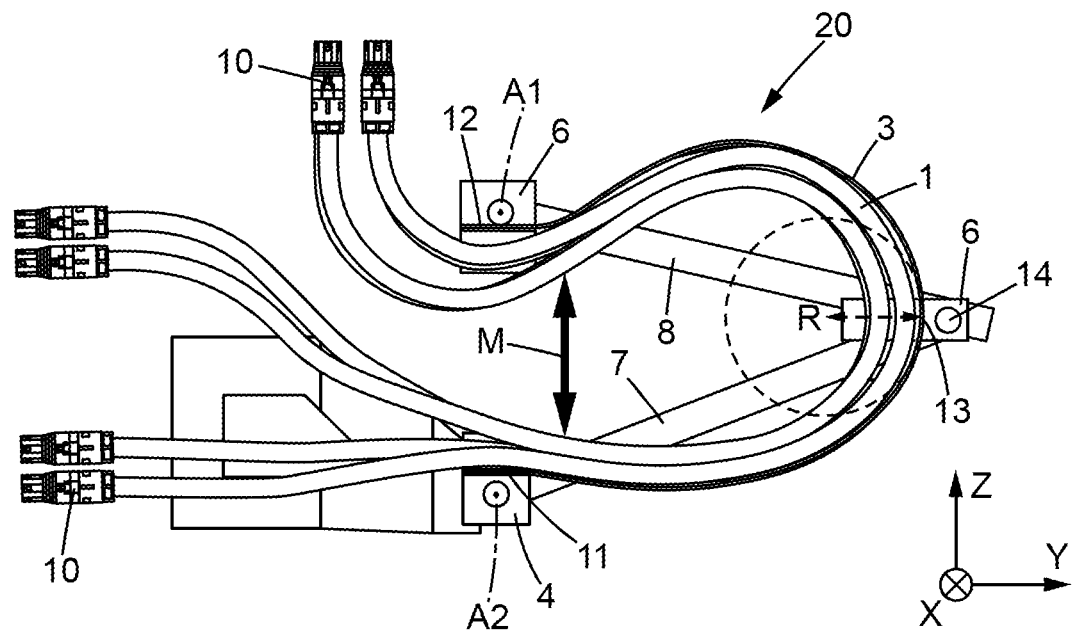
FIG. 4 is a front view of the retaining system of FIG. 2.

As represented more particularly on FIG. 4, the third fixing bracket 6 is arranged at an equal distance from the first fixing bracket 4 and from the second fixing bracket 5. In other words, the third fixing bracket 6 is disposed, along the length of the flexible C-shaped retaining member 3, halfway between the first fixing bracket 4 and the second fixing bracket 5. On this figure, the arrow M illustrates the vertical movements of the first fixing bracket 4 relatively to the second fixing bracket 5. Relative movements along the transverse direction Y are also possible.

In the represented embodiment, the first fixing bracket 4 is integral with the C-shaped retaining member 3. Similarly, the second fixing bracket 5 and the third fixing bracket 6 are integral with the C-shaped retaining member 3.

The C-shaped retaining member 3 may be in plastic. The C-shaped retaining member 3 can also be in aluminum.

The first fixing bracket 4, the second fixing bracket 5 and the third fixing bracket 6 can for example be molded together with the C-shaped retaining member 3. The first fixing bracket 4, the second fixing bracket 5 and the third fixing bracket 6 can also be over-molded on C-shaped retaining member 3 when the brackets 4, 5, 6 and the retaining member 3 are made of different materials.

Alternatively, each fixing bracket can be a separate part from the retaining member 3. Each fixing bracket can be secured to the retaining member 3 by any appropriate mechanical fixing, such as for example screw, clip, insertion of the retaining member 3 in a slot of the fixing bracket.

A cross section of the electrical cables 1 is here larger than 20 mm² (square millimeters). The cross section of the electrical cables 1 is adapted to the current intensity to be conveyed through the cables, therefore to the power of the electrical equipment 2.

On the different figures of the illustrated example, the first linking rod 7 and the second linking rod 8 have a common pivot axis relatively to the third fixing bracket 6. The first linking rod 7 and the second linking rod 8 are for example pivotally mounted on a same pivot 14 of the third fixing bracket 6. The first linking rod 7 and the second linking rod 8 make two consecutive sides of an acute triangle. The pivot 14 plays the role of a vertex of the triangle. In the illustrated example, the triangle is isosceles.

In an alternative embodiment, non-represented, the third fixing bracket 6 may comprise a first pivot receiving an end of the first linking rod 7 and a second pivot receiving an end of the second linking rod 8, the two pivots being parallel to each other. In this case the first linking rod 7, the second linking rod 8 and the third fixing bracket 6 makes three consecutive sides of a deformable parallelogram.

Figure 5:
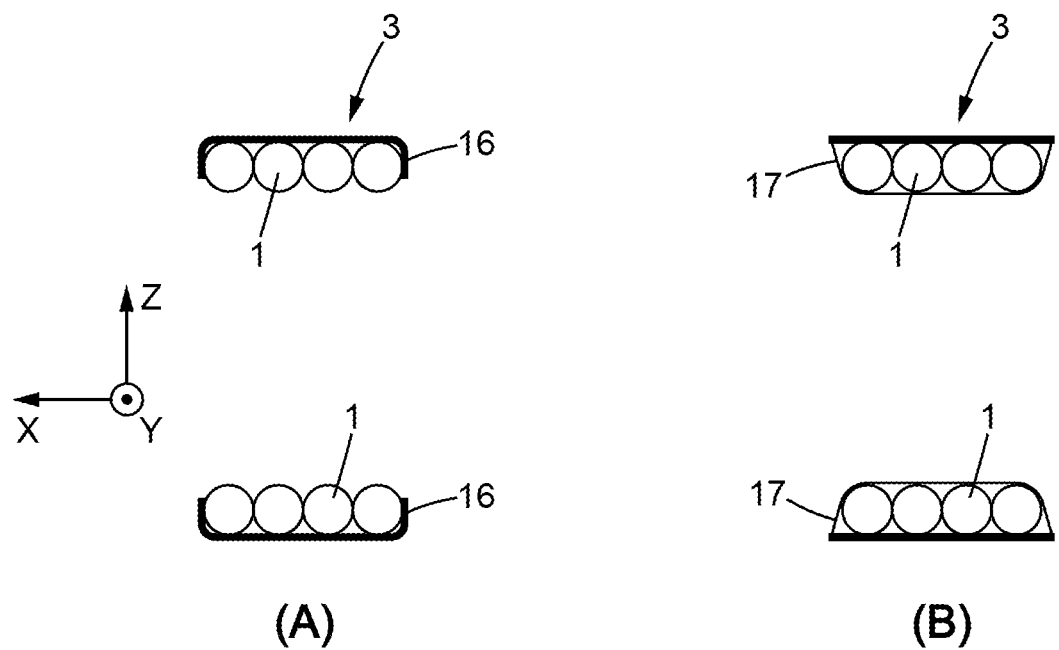
FIG. 5 is a side view of two variants of the retaining system.
Figure 6:
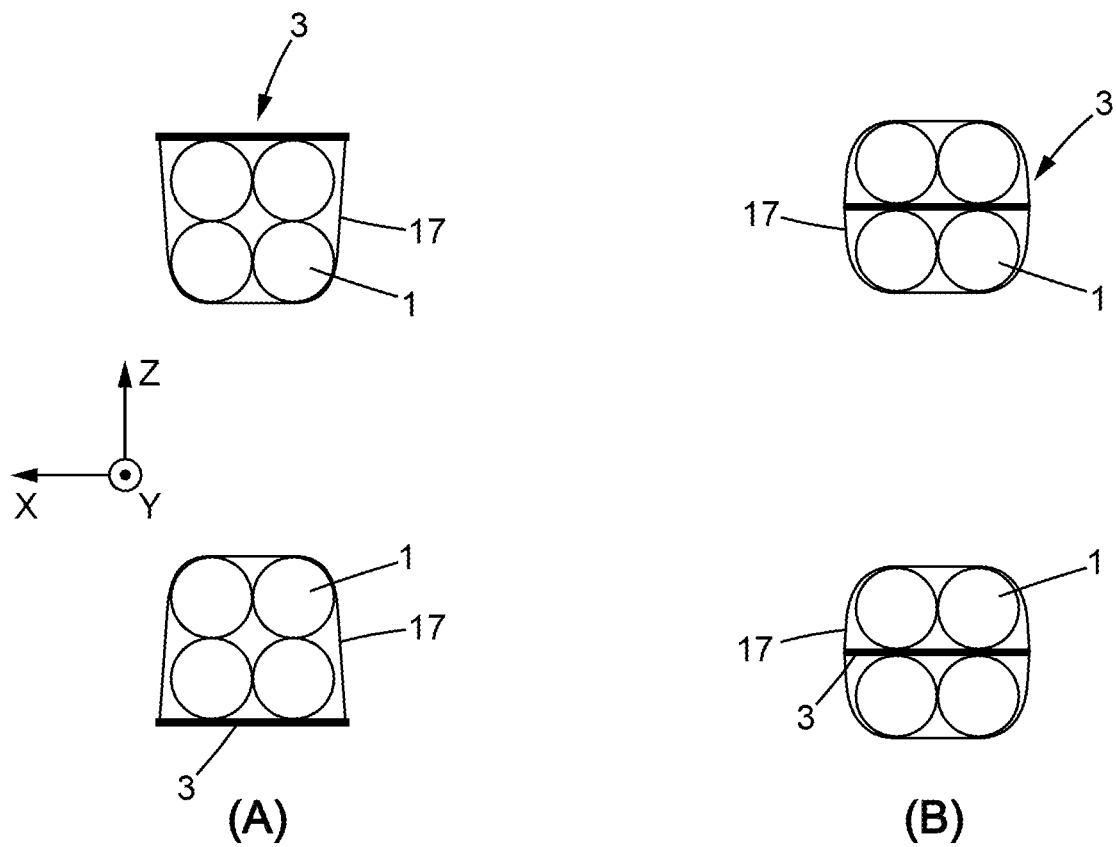
FIG. 6 is a side view of another two variants of the retaining system.

The retention of the electrical cables 1 in the C-shaped retaining member can be achieved in different ways, more specifically illustrated on FIGS. 5 and 6.

Figure 3:
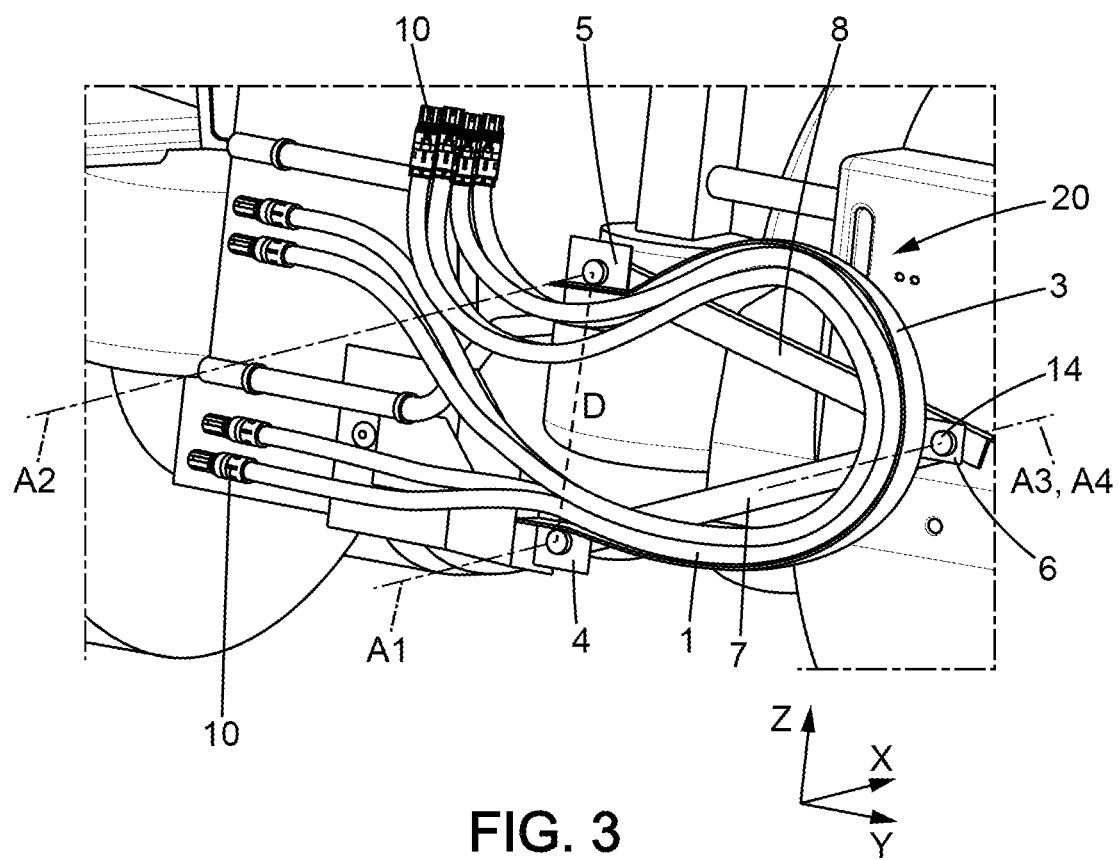
FIG. 3 is another general view of the retaining system of FIG. 2, under a different view angle.

In an embodiment, illustrated on part A on FIG. 5, the C-shaped retaining member 3 comprises curled edges 16 forming an abutment member for the electrical cables 1. The shape and size of the curled edges 16, associated with the stiffness of the cables 1, are sufficient to secure the electrical cables 1 in the C-shaped retaining member 3. A translation along the axis X as represented on FIGS. 2 to 4 is prevented, the edges 16 preventing the cables from coming off the retaining member 3.

Alternatively, or as a complement, the retaining system 20 can comprise clamps 17 configured for securing the electrical cables 1 to the C-shaped retaining member. The clamps avoid the cables from slipping out of the retaining member 3, particularly when the bearing surface of the retaining member 3 is flat.

The clamps may be attached to both edges of the retaining member 3 and maintain the cables against the inside surface of the retaining member 3, on represent on part B of FIG. 5 and part A of FIG. 6. The clamps may be wrapped around both the C-shaped retaining member 3 and the electrical cables 1, as illustrated on part B of FIG. 6. On part B of FIG. 5, the electrical cables are all in contact with the retaining member 3 and extends in a plane. On part A of FIG. 6, all the cables are also disposed on the same side of the retaining member 3, but only one half of the cables is facing the retaining member 3, the other cables being piled on the cables facing the retaining member 3. On part B of FIG. 6, one half of the cables are disposed on one side of the retaining member 3, and the other half is disposed on the other side.

The clamps 17 may be like wires staggered along the length of the retaining member 3, each clamp having linear contact with the electrical cables 1. For example, three clamps may be installed. Each clamp 17 can also be like a sheath of a given length, establishing a surface contact with the electrical cables 1.

In the illustrated embodiment, the first linking rod 7 and the second linking rod 8 have identical length. The length of the first linking rod 7 is comprised between 500 millimeters and 800 millimeters. The length of the second linking rod 8 is comprised between 500 millimeters and 800 millimeters.

A developed length of the C-shaped retaining member 3 is comprised between 1200 millimeters and 1800 millimeters. The developed length is the measured length when the retaining member 3 is unfolded and forced to rest on a flat surface. A minimum curvature radius R of the C-shaped retaining member 3 is comprised between 150 millimeters and 250 millimeters. The minimum curvature radius R is measured in the normal installation position of the retaining member 3, when the truck 100 is still.

As particularly visible on FIG. 2 and FIG. 3, the first fixing bracket 4 and the second fixing bracket 5 are located on a same axis D parallel with the vertical axis Z when the retaining system 20 is in a normal installation position in the industrial vehicle 100. The frame 60 of the truck 100 is not represented on FIG. 3.

The pivot axis A1 of the first linking rod 7 relatively to the first fixing bracket 4 is parallel to the pivot axis A3 of the first linking rod 7 relatively to the third fixing bracket 6. The pivot axis A2 of the second linking rod 8 relatively to the second fixing bracket 5 is parallel to the pivot axis A4 of the second linking rod 8 relatively to the third fixing bracket 6. In the represented example, axis A3 coincides with axis A4.

In an embodiment, the distance between the pivot axis A1 of the first linking rod 7 relatively to the first fixing bracket 4 and the pivot axis A2 of the second linking rod 8 relatively to the second fixing bracket 5 is comprised between 200 millimeters and 300 millimeters.

The first linking rod 7 and the second linking rod 8 extend in a plane perpendicular to the pivot axis A1, A2, A3, A4 of the linking rods 7,8.

The movements of the retaining member 3 are located in a plane. The space needed to accommodate the retaining system is limited.

Figure 7:
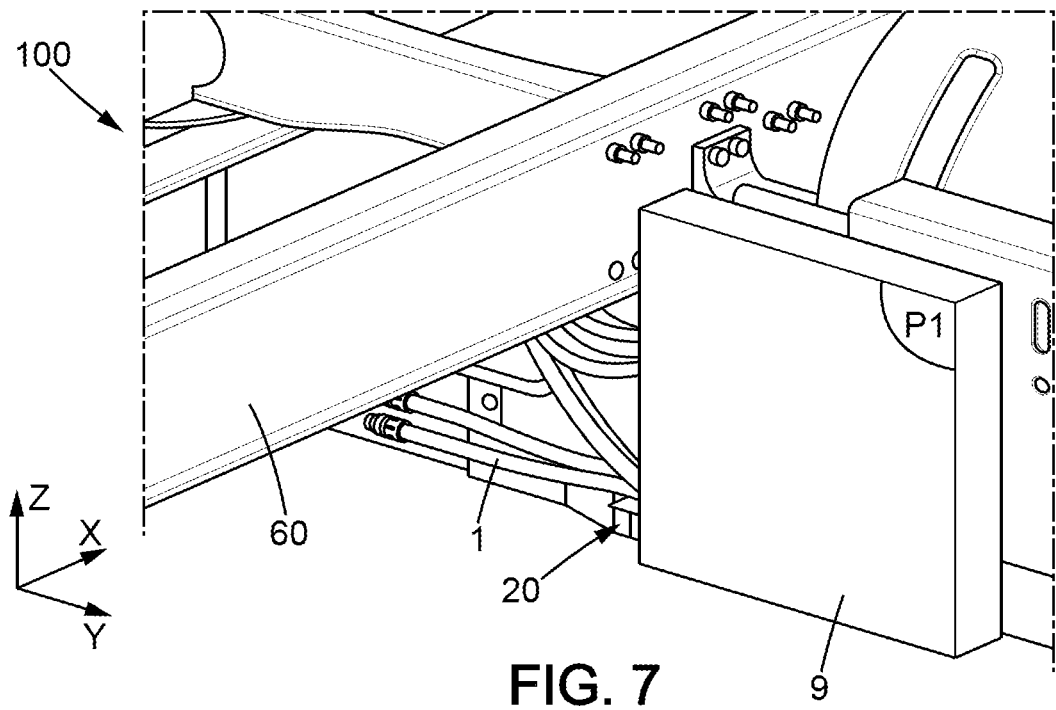
FIG. 7 is another detailed view of an industrial vehicle equipped with retaining system according to an embodiment.
Figure 8:
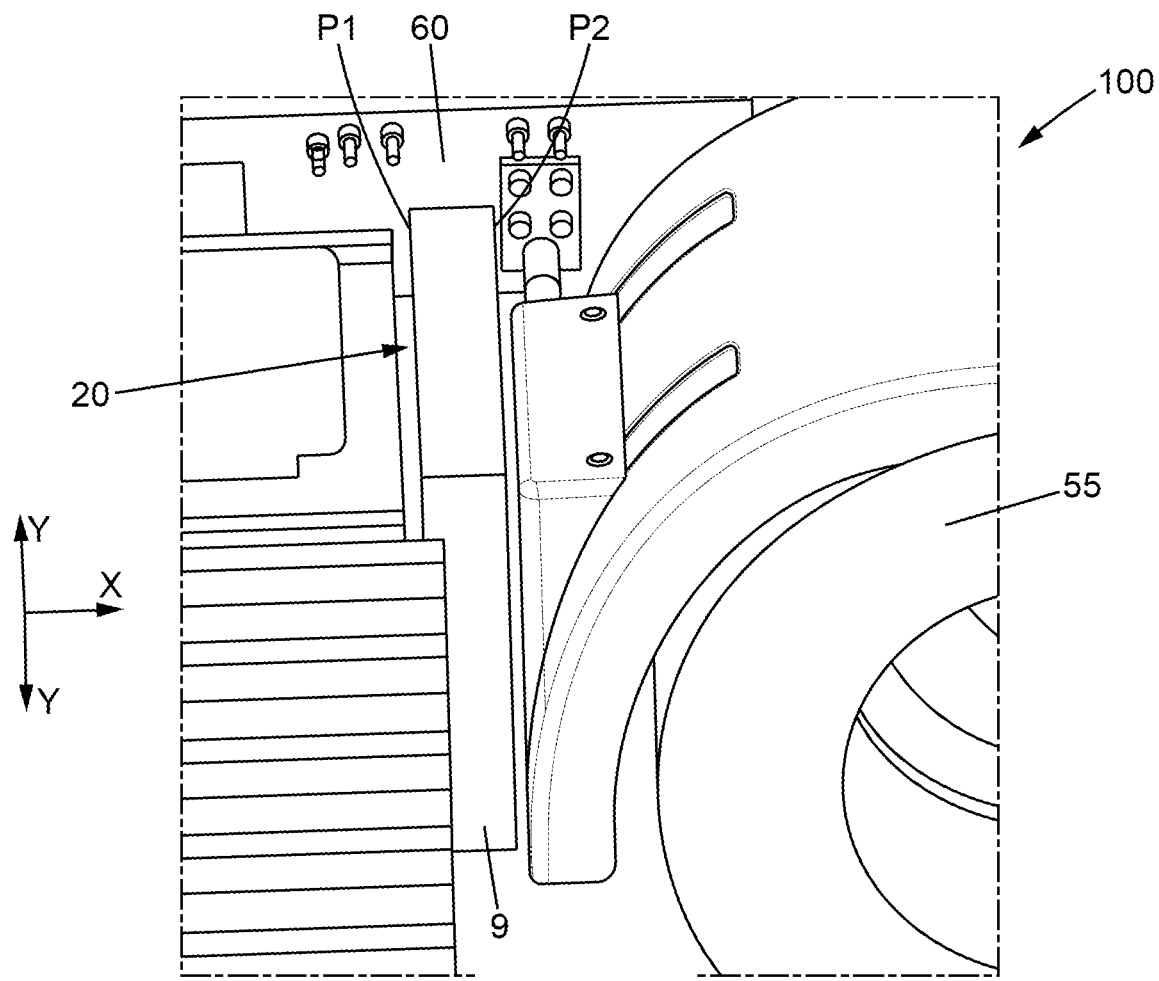
FIG. 8 is another detailed view of the industrial vehicle of FIG. 7, under a different view angle.

In an embodiment, illustrated on FIG. 7 and FIG. 8, the retaining system 20 comprises a housing 9 configured for receiving the C-shaped retaining member 3, the first linking rod 7 and the second linking rod 8. The housing 9 protects the retaining member 3, the linking rods 7,8 and the electrical cables 1 from the impacts caused by stones or any object projected by the wheels of the industrial vehicle 100. It also protects the articulations of the mechanism from water ingress. The linking rods 7, 8 can rotate relatively to each other inside the housing 9 without making contact with the side walls of the housing 9. The width of the housing is selected so that the linking rods and the retaining member 3 stay at a distance from the side walls of the housing 9.

The housing 9 may have a cuboid shape. The housing 9 is similar to a box with five closed sides and one opened side. The housing 9 may be made of single part. The housing 9 may be made of several parts, such as a first tubular part with a rectangular cross-section on which a lid is fitted.

The housing 9 may be in plastic. The housing 9 may be fixed to the frame 60 of the industrial vehicle 100.

In the embodiment of FIGS. 7 and 8, the retaining system 20 extends between two vertical planes P1, P2 each perpendicular to a longitudinal axis X of the industrial vehicle 100. The two planes P1, P2 are parallel.

The electrical cables 1 and the retaining system 20 are in this embodiment located behind a wheel 55 of a driving axle of the truck 100. The electrical cables 1 and the retaining system 20 can also be installed in front of a wheel 55 of a driving axle, as it is the case on the embodiment of FIG. 1. Different implementations are possible, depending on the general packaging of the different vehicle components.

The invention claimed is:

1. A retaining system for holding and routing electrical cables of an industrial vehicle, the electrical cables being configured to electrically supply an electrical equipment, the retaining system comprising:
   a C-shaped flexible retaining member, configured for receiving the electric cables, the retaining member comprising:
      a first fixing bracket configured to be fixed to the electrical equipment,
      a second fixing bracket configured to be fixed to a frame of the industrial vehicle,
   the retaining system further comprising:
      a first linking rod,
      a second linking rod,
   wherein the first linking rod is pivotally mounted relatively to the first fixing bracket, and wherein the second linking rod is pivotally mounted relatively to the second fixing bracket, so as to guide the retaining member when the electrical equipment moves relatively to the frame.

2. The retaining system according to claim 1, wherein the C-shaped retaining member comprises a third fixing bracket, wherein the first linking rod is pivotally mounted relatively to the first fixing bracket and relatively to the third fixing bracket,
and wherein the second linking rod is pivotally mounted relatively to the second fixing bracket and relatively to the third fixing bracket.

3. The retaining system according to claim 1, in which the electrical equipment is flexibly mounted relatively to the frame of the industrial vehicle.

4. The retaining system according to claim 1, in which:
   the first fixing bracket is arranged at a first end of the retaining member, and in which
   the second fixing bracket is arranged at a second end of the retaining member.

5. The retaining system according to claim 4, in which the third fixing bracket is arranged at an intermediate position between the first end of the retaining member and the second end of the retaining member.

6. The retaining system according to claim 1, in which a cross section of the electrical cables is larger than 20 mm$^2$.

7. The retaining system according to claim 1, in which the first linking rod and the second linking rod are pivotally mounted on a same pivot of the third fixing bracket.

8. The retaining system according to claim 1, in which the C-shaped retaining member comprises curled edges forming an abutment member for the electrical cables.

9. The retaining system according to claim 1, comprising clamps configured for securing the electrical cables to the C-shaped retaining member.

10. The retaining system according to claim 1, in which the first fixing bracket and the second fixing bracket are located on a same vertical axis when the retaining system is in a normal installation position in the industrial vehicle.

11. The retaining system according to claim 1, in which:
   the pivot axis of the first linking rod relatively to the first fixing bracket is parallel to the pivot axis of the first linking rod relatively to the third fixing bracket, and in which
   the pivot axis of the second linking rod relatively to the second fixing bracket is parallel to the pivot axis of the second linking rod relatively to the third fixing bracket.

12. The retaining system according to claim 1, in which the first linking rod and the second linking rod extend in a plane perpendicular to the pivot axis of the linking rods.

13. The retaining system according to claim 1, comprising a housing configured for receiving the C-shaped retaining member, the first linking rod and the second linking rod.

14. An industrial vehicle, comprising:
   the electrical equipment, the electrical cables configured for electrically supplying the electrical equipment, the retaining system according to claim 1,
   in which the electrical cables are received in the C-shaped retaining member of the retaining system.

15. The industrial vehicle according to claim 14, in which the retaining system extends between two vertical planes each perpendicular to a longitudinal axis of the industrial vehicle.

* * * * *